May 19, 1970  O. C. CALKINS  3,512,667
BOAT TRAILER
Filed April 21, 1969  2 Sheets-Sheet 1
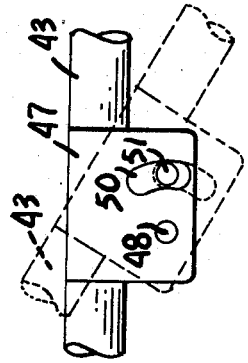
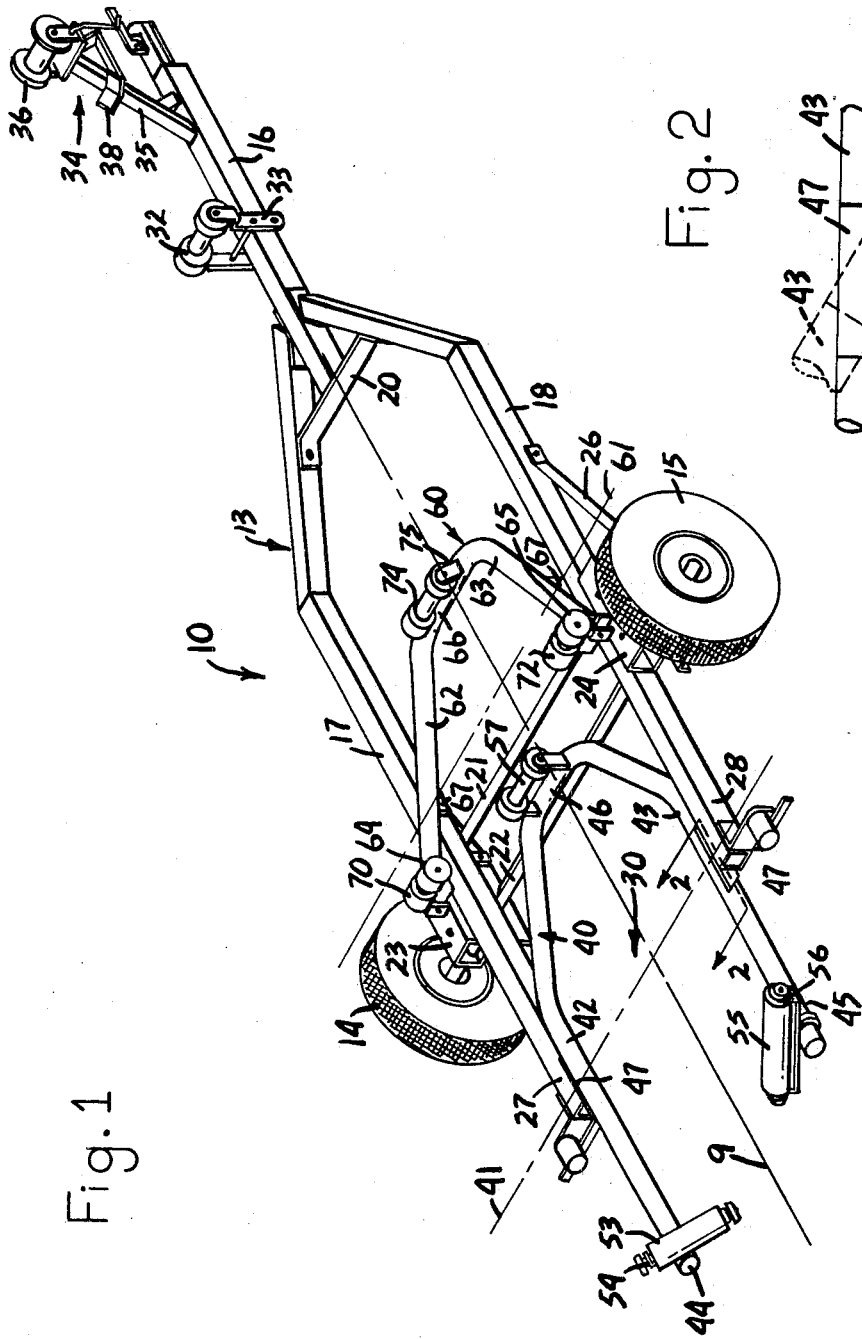
INVENTOR.
Oscar C. Calkins
BY Wells & St. John
ATTYS.

May 19, 1970  O. C. CALKINS  3,512,667
BOAT TRAILER

Filed April 21, 1969  2 Sheets-Sheet 2

INVENTOR.
OSCAR C. CALKINS
BY Wells & St. John
ATTYS.

United States Patent Office 3,512,667
Patented May 19, 1970

3,512,667
BOAT TRAILER
Oscar C. Calkins, Spokane, Wash., assignor to Calkins Manufacturing Company, Spokane, Wash., a corporation of Washington
Filed Apr. 21, 1969, Ser. No. 817,781
Int. Cl. B60p 3/10
U.S. Cl. 214—505          7 Claims

ABSTRACT OF THE DISCLOSURE

A boat trailer is described having independent self-adjusting U-shaped cradles pivotally mounted on the main frame for supporting a boat on the trailer. Side rollers are mounted on the ends of the U-shaped cradles for engaging the sides of the boat hull. A keel roll is mounted at the apex of the cradle for engaging the keel of the boat to provide a counter movement so that both the keel roll and the side rollers are proportionally supporting the boat.

Background of the invention

This invention relates to boat trailers for loading, unloading and transporting small pleasure motorboats.

Many pleasure boats, including cabin cruisers, are being constructed from reinforced fiberglass coated with plastic resins. The principal reinforcement is accomplished at the transom and the keel to provide a strong boat hull. Frequently large outboard motors are mounted on the transom of the boat requiring substantial support at the rear end of the trailer.

Numerous attempts have been made to develop boat trailers that could be easily adjusted to properly support boats of various hull configurations and profiles. Many boat trailers utilize a combination of keel rolls and side rollers to support the boat. In such trailers, the side rollers generally require elevation and angular adjustment with respect to the keel rollers to conform to the contour of different boats. Examples of such trailers are illustrated in the U.S. Pats. 3,691,534 and 2,865,522. This means that the trailer must be adjusted to each boat that is placed on the trailer. Frequently the adjustment has to be done through trial and error. Often, it is difficult to accurately make adjustments and as a consequence imbalanced support frequently occurs.

One advantage attributed to keel rolls is the ability to minimize the side shift of the boat on the trailer during movement. Some trailers are designed to principally support the boat on keel rollers and position side rollers to provide some transverse stability without providing much weight support.

Other trailers have been constructed to support the boat principally on the side rollers, either totally without keel rolls or with minimum keel support at the bow of the boat in an attempt to overcome the problem of adjustment between the keel rolls and the side rollers to adequately support the boat.

Often times considerable stress is placed on the boat hull during the loading and unloading because of the inability of the support rollers to vertically adjust to the changing contours of the boat from the bow to the stern.

One of the principal objects of this invention is to provide a self-adjusting cradle support for a boat trailer to maintain a keel roll and a side roller in contact with and supporting the boat for a variety of boat contours.

An additional object of this invention is to provide a boat trailer that may be used for transporting a variety of boats without requiring elevational adjustment of the keel rolls or side rollers.

A further object of this invention is to provide a self-adjusting cradle support that self-equalizes the support of the boat between a keel roll and adjacent side rollers.

An additional object of this invention is to provide a boat trailer that has front and rear self-adjusting cradles, each having a roll and side rollers for proportionally equalizing the support pressure between the keel rolls and the side rollers.

These and other objects and advantages of this invention will become apparent upon the reading of the following detailed description of a preferred embodiment.

Brief description of the drawings

A preferred embodiment of this invention is illustrated in the accompanying drawings, in which:

FIG. 1 is a perspective view of a boat trailer embodying the principles of this invention showing a front and a rear cradle pivotally mounted on a main frame of the boat trailer;

FIG. 2 is a cross sectional view taken along line 2—2 in FIG. 1 showing the pivotal connection of the rear cradle on the frame;

Detailed description of a preferred embodiment

Figure 3:
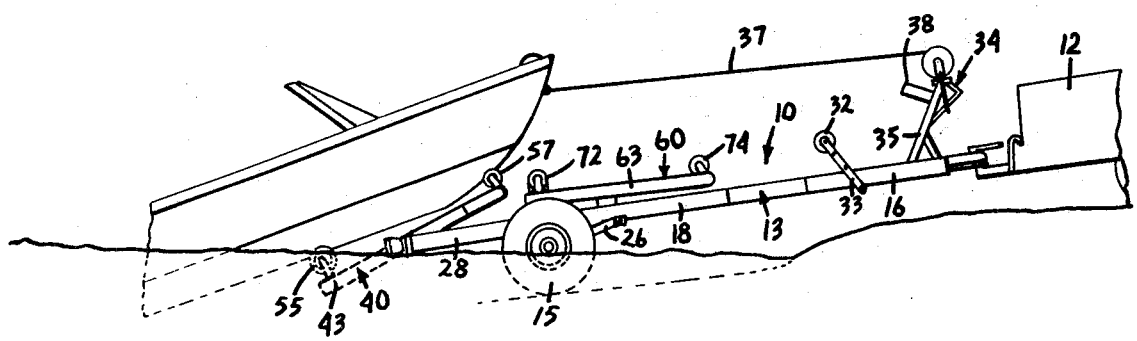
FIGS. 3–5 are sequence views showing a boat being loaded onto the trailer emphasizing the self-adjusting features of the front and rear cradles.
Figure 4:
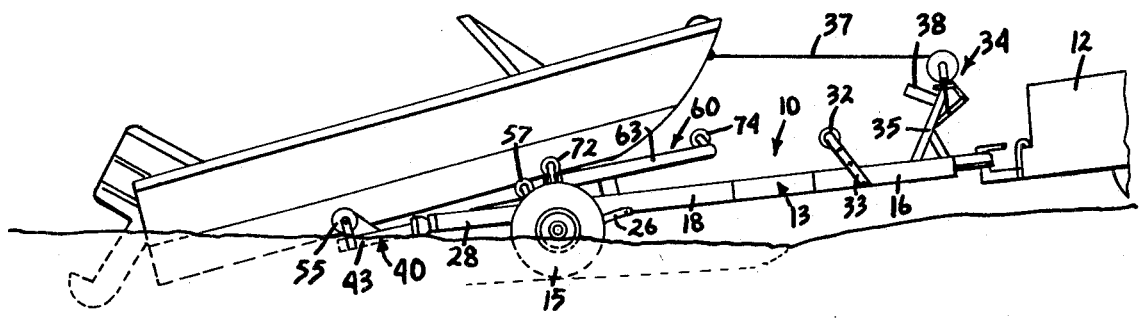
Figure 5:
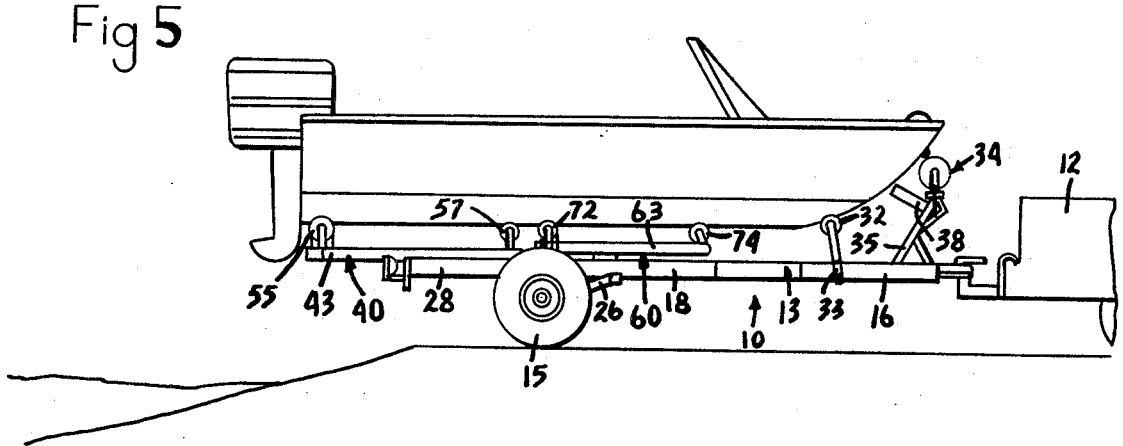

A boat trailer 10 having a center line 9 is illustrated in FIG. 1 for transporting a boat thereon and for loading and unloading the boat into the water (FIGS. 3–5). The boat is transported on the boat trailer behind a towing vehicle 12.

The boat illustrated in FIGS. 3–5 is a relatively small pleasure boat principally used for fishing, water skiing and general pleasure boating purposes. The length of the boats of this class generally range up to approximately 21 feet in length and weigh up to 3000 pounds. The boats are frequently made of fiberglass having reinforced transoms and keels. Often large outboard motors are mounted on the transom requiring substantial trailer support at the rear of the boat.

The boat trailer 10 includes a main frame 13 supported by side wheels 14 and 15. The main frame includes a tongue 16 that extends forward along the center line 9. The main frame includes side channels 17 and 18 that extend rearwardly from the tongue parallel with an equally spaced from the center line. The side channels 17 and 18 extend rearward beyond the wheels terminating in ends 27 and 28. A front cross brace 20 interconnects the front end of the side channels 17 and 18 to provide a rigid connection with the tongue 16. Cross channels 21 and 22 interconnect the side channels 17 and 18 in-between the wheels 14 and 15. Coil spring housings 23 and 24 are mounted on the ends of the cross channels 21 and 22 and attached to the side channels 17 and 18 respectively. An axle 25 extends between the wheels 14 and 15 and is resiliently supported below the spring housings 23 and 24. Axle braces 26 extend rearward and downward from the side channels 17 and 18 to the axle 25 to provide stability. There are no cross braces rearward of the channel 22 thereby forming an unobstructed frame space 30 between the ends 27 and 28.

A forward keel roll 32 is mounted on the tongue 16 by a bracket 33. A winch assembly 34 is mounted at the forward end of the tongue 16 for pulling a boat from the water and onto the trailer. The winch assembly includes a brace 35 that is affixed to the tongue with a winch 36 mounted on the top thereof. A rope 37 (FIGS. 3 and 4) is wound on the winch for attaching to the bow of the boat to pull the boat onto the trailer. A V-shaped bow bracket 38 is mounted on the brace 35 for receiving and holding the bow of the boat.

One of the principal elements of the boat trailer is a rear hull engaging means that has a self-centering feature for proportionately supporting the rear of the trailer at the keel and transom. The rear hull engaging means includes a rigid cradle frame 40 that is pivotally mounted to the main frame 13 for free pivotal movement within the boundary of the frame space 30 about a transverse axis 41. The cradle frame 40 is mounted symmetrical with the center line 9. Cradle 40 is substantially U-shaped with one leg 42 and a second leg 43 that extend rearward from the channel ends 27 and 28 respectively to maintain the frame space 30 substantially unobstructed. The legs 42 and 43 terminate in ends 44 and 45 respectively. The cradle frame has an apex 46 that is located at the center line of the trailer. The pivotal connection of the cradle frame to the rigid frame includes brackets 47 (FIGS. 1 and 2) that are mounted to the sides of each leg 42 and 43. Shaft bolts 48 (FIG. 2) extend through the ends of the channel ends 27 and 28 and the brackets 47 to provide a pivotal connection and support. The brackets 47 have elongated slots 50 formed therein to accommodate bolts 51 that extend from the channel ends 27 and 28. The slot only restricts the pivotal movement of the cradle frame so that the rear ends and the apex of the cradle frame will not drag on the ground. Otherwise the cradle frame is free to pivot.

A transom or side roller 53 is tranversely mounted on the end 44 for supporting one side of the hull adjacent the transom. The roller 53 is rotatably mounted on a bracket 54 that is pivotally fixed to the end 44 to accommodate the contour of the hull. A transom or side roller 55 is transversely mounted on the end 45 for engaging the other side of the hull adjacent the transom an directly opposite the roller 53. The transom roller 55 is rotatably mounted on a bracket 56 that is pivotally mounted on the end of the cradle 45 to accommodate and adjust to the contour of the hull. A keel roll 57 is rotatably mounted at the apex 46 of the cradle frame for engaging and receiving the keel of the boat.

The transom rollers 53 and 55 are spaced rearward of the transverse axis 41 a specific distance providing a pivot moment. The keel roll 57 is mounted forward of the transverse axis 41 by a specific distance for providing a counter moment to the pivot moment created by the transom rollers 53 and 55 so that proportional support is provided at all times during transport by both the keel roll and the side rollers. In a specific case the distance between the side rollers 53 and 55 and the transverse axis 41 may be less than the distance from the transverse axis 41 to the keel roll 57 so that a proportionately larger amount of the weight is supported by the transom rollers adjacent to the transom of the boat.

The boat trailer further includes a self-adjusting front hull engaging means having a rigid substantially U-shaped cradle frame 60 that is pivotally mounted to the main frame forward to cradle frame 40 for pivotal movement about a transverse axis 61 for supporting the forward part of the boat. The cradle frame includes a leg member 62 and a leg member 63 that extend backward to terminate at ends 64 and 65. The legs 62 and 63 are connected at an apex 66. Brackets 67 are affixed to the leg 62 and 63 between the apex 66 and the ends 64 and 65 for pivotal connection with the side channels 17 and 18 substantially forward of the wheel axle. A side roller 70 is rotatably mounted on the end 64 for engaging one side of the hull forward of the transom roller 53. A side roller 72 is rotatably mounted on the end 65 for engaging the other side of the hull forward of the transom roller 55. A keel roll 74 is rotatably mounted on the cradle frame 60 at the apex 66 transversely aligned on the center line. The keel roller 74 is rotatably mounted on a bracket 75 that is affixed at the apex 66.

The side rollers 70 and 72 are longitudinally spaced rearward of the transverse axis 61 while the keel roll 74 is longitudinally spaced forward of the transverse axis 61 to provide a counter moment for proportionately distributing the weight support between the keel roll and the side rollers. The distances between the side rollers and the transverse axis 61 and the transverse axis 61 and a keel roll may be varied depending upon the desires of the manufacturer to vary the degree of support between the side rollers and the keel rollers.

Not only are the cradle frame 40 and 60 separately self-adjusting but they are self-adjusting with respect to each other to accommodate and adjust to varying hull configurations and distributions of weight of the boat.

The operation of the boat trailer in loading a boat onto the trailer is illustrated in FIGS. 3–5. FIG. 3 shows the rope 37 of the winch assembly connected to the bow of the boat with the bow of the boat being pulled forward onto the rear cradle frame 40. Initially the hull at the bow engages the side rollers 53 and 55. The boat moves over the rollers 53 and 55 with the bow of the boat at the keel engaging the keel rollers 57. As the boat is continually moved forward the cradle frame 40 pivots from the rearwardly inclined position shown in FIG. 4 toward a substantial horizontal position show in FIG. 5. As the boat moves forward, the cradles 40 and 60 pivot to accommodate for the hull configuration between bow and stern and the difference in weight distribution to maintain the keel rolls 57 and 74 and the side rollers 53, 55, 70, 72 in supporting engagement with the hull. The transport orientation of the cradles 40 and 60 will depend upon the contour of the boat.

The final position of the boat is shown in FIG. 5 with the transom rollers 53 and 55 engaging the boat adjacent the transom to support the larger portion of the rear weight. The cradles will pivot slightly as the boat is being transported to accommodate frame twisting, boat shifting, etc.

When referring to the cradle frames 40 and 60 as substantially U-shaped, this refers to frames having an opening between two leg members. V-shapes and C-shapes are included in what is termed "substantially U-shaped."

What is claimed is:

1. A boat trailer for loading and unloading a boat into water and for transporting the boat behind a towing vehicle, comprising:
   (a) a wheel supported main frame having a forward extending tongue aligned along a center line for connecting to the towing vehicle;
   (b) a front hull engaging means mounted on the main frame for supporting a front portion of the boat;
   (c) a rear hull engaging means spaced rearward of the front hull engaging means for supporting a rear portion of the boat;
   (d) said rear hull engaging means includes a cradle frame pivotally mounted on the main frame for self-adjusting movement about a transverse pivot axis;
   (e) said cradle frame having transverse side rollers mounted thereon longitudinally spaced rearward of the transverse pivot axis and transversely spaced on both sides of the center line for engaging the sides of the hull spaced from the keel; and
   (f) said cradle frame having a keel roll mounted thereon transversely centered on the center line and longitudinally spaced forward of the transverse axis for engaging the keel longitudinally spaced from the side rollers with no keel support mounted on the rear cradle frame rearward of the transverse pivot axis to counterbalance the cradle frame to provide proportional support of the rear portion of the boat at the keel and at the sides of the hull.

2. A boat trailer as defined in claim 1 wherein the cradle frame is substantially U-shaped and is symmetrically mounted on the main frame in relation to the center line with an open end facing rearward and the transverse pivot axis intermediate the ends and the apex and wherein the transverse side rollers are mounted adjacent the ends and the keel roller is mounted at the apex.

3. A boat trailer as defined in claim 1 wherein the front hull engaging means includes a second cradle frame pivotally mounted on the main frame for self-adjusting movement about a second transverse pivot axis forward of the first transverse pivot axis and wherein further side rollers are mounted on the second cradle frame longitudinally spaced in one direction from the second transverse pivot axis and transversely spaced on both sides of the center line for engaging the sides of the hull forward of the side rollers on the rear hull engaging means and a keel roller is mounted on the second cradle frame aligned on the center line and longitudinally spaced from the second transverse axis in the opposite direction for engaging the keel longitudinally spaced from the side rollers to counterbalance the second cradle frame to provide proportional support of the front portion of the boat at the keel and the sides of the boat.

4. A boat trailer as defined in claim 1 wherein the main frame includes two side channels that are equally spaced on both sides of the center line with unconnected ends extending rearward to provide an unobstructed space therebetween and wherein the cradle frame is pivotally mounted adjacent the ends of the side channels with the cradle frame opening rearward to initially receive the bow of the boat during loading.

5. A boat trailer as defined in claim 1 wherein the side rollers are longitudinally spaced on the cradle frame to engage the boat adjacent the transom.

6. A boat trailer as defined in claim 2 wherein the main frame includes two side channels that are equally spaced on both sides of the center line with unconnected ends extending rearward to provide an unobstructed space therebetween and wherein the cradle frame is pivotally mounted adjacent the ends of the side channels with the cradle frame opening rearward to initially receive the bow of the boat during loading.

7. A boat trailer as defined in claim 2 wherein the side rollers are longitudinally spaced on the cradle frame to engage the boat adjacent the transom.

References Cited
UNITED STATES PATENTS

| | | | |
|---|---|---|---|
| 2,827,188 | 3/1958 | Reeder | 214—505 |
| 2,834,492 | 5/1958 | Roy et al. | 214—505 |

ALBERT J. MAKAY, Primary Examiner

U.S. Cl. X.R.

214—84